Nov. 28, 1944.  W. F. GAUNDER  2,363,954
CONSTRUCTION FOR GLASS MELTING TANKS
Filed June 5, 1942  2 Sheets-Sheet 2
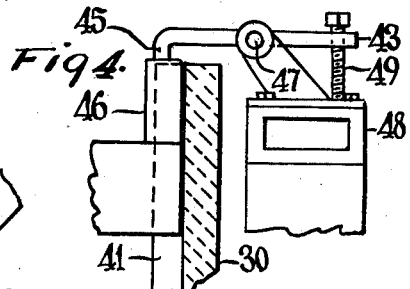
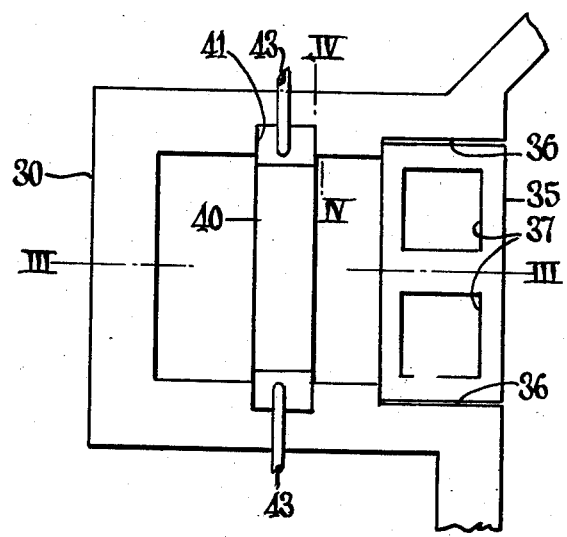
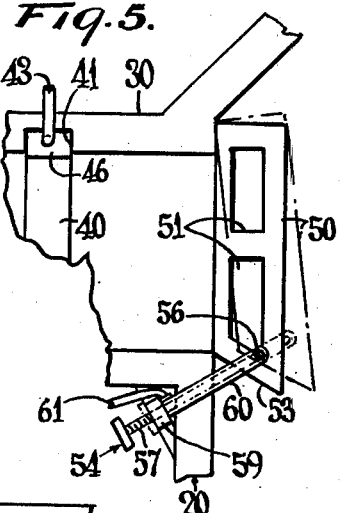
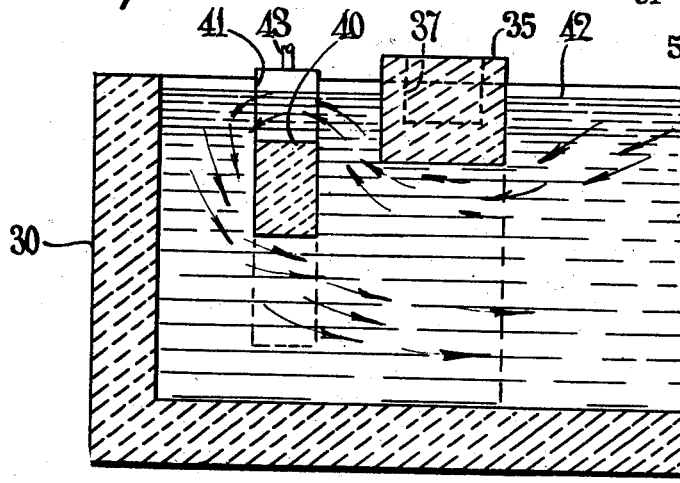
Inventor
WILBUR F. GAUNDER
By Olen E. Bee
Attorney Patented Nov. 28, 1944

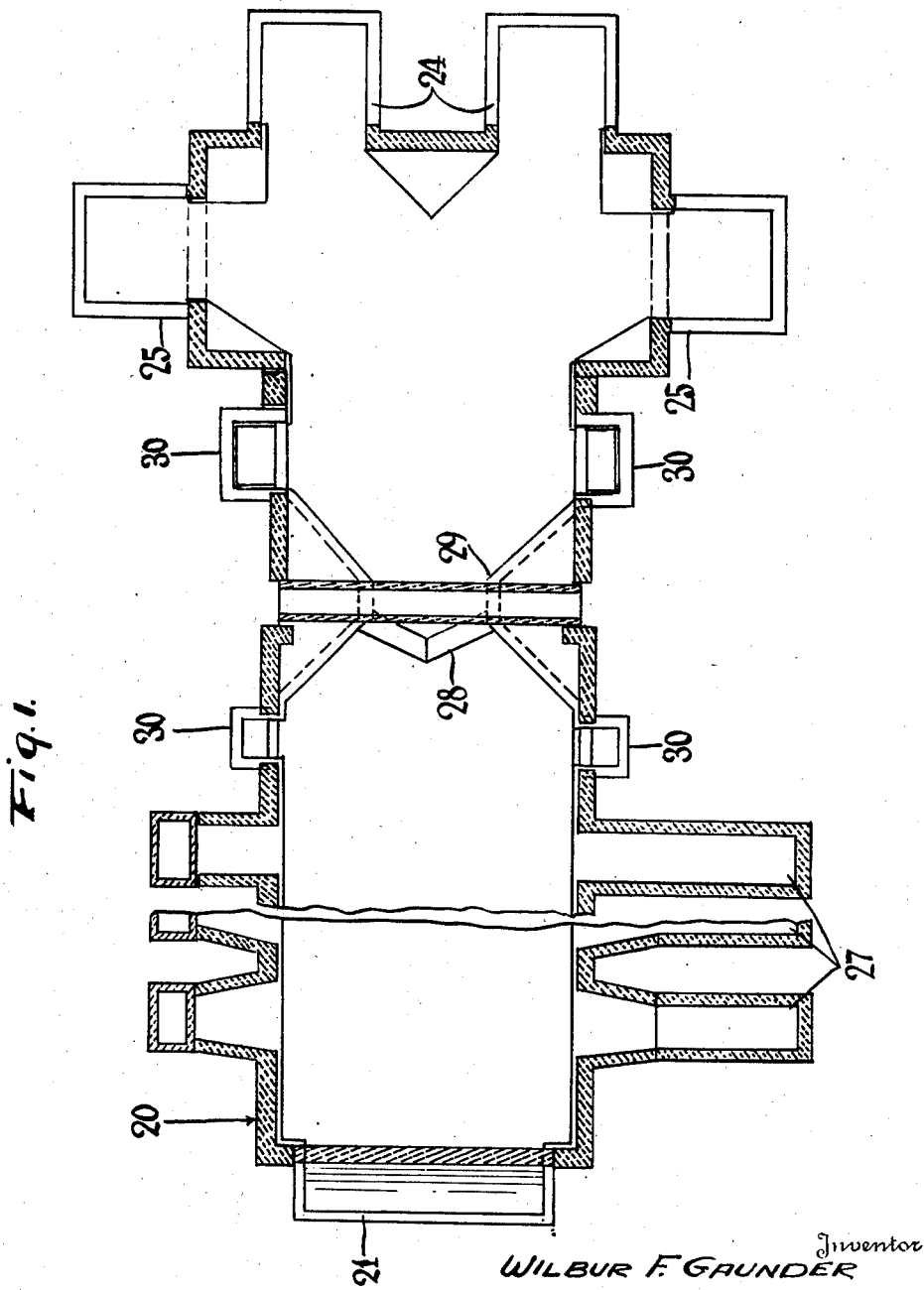

2,363,954

UNITED STATES PATENT OFFICE 2,363,954

CONSTRUCTION FOR GLASS MELTING TANKS

Wilbur F. Gaunder, Mount Vernon, Ohio, assignor to Pittsburgh Plate Glass Company, Allegheny County, Pa., a corporation of Pennsylvania Application June 5, 1942, Serial No. 445,903

7 Claims. (Cl. 49—54)

This invention relates to the control of molten glass baths and it has particular relation to apparatus designed to aid in refining molten glass preparatory to withdrawing it from the bath.

One object of the invention is to provide an improved arrangement of structure in a tank for diverting impurities in a bath of molten glass before they reach glass drawing chambers and returning such impurities for further refinement in the body of the bath.

Another object of the invention is to provide an improved tank for molten glass wherein the portions thereof can be controlled as to direction of movement.

Another object of the invention is to provide an improved skim kiln or compartment in connection with a tank for molten glass to divert impurities or unrefined glass ingredients from the location of withdrawal of the glass from the tank.

In the operation of a glass melting tank or furnace, particularly the type employed in connection with the drawing of window glass, it has been recognized that the better quality of glass passes down the central portion of the tank to the so-called central drawing chambers at the forward end of tank. Certain types of tanks are so constructed that there are one or more drawing chambers at the front central extremity of the tank and at least one drawing chamber at each side of the tank adjacent its front extremity. The glass drawn from the side chambers generally is not as good in quality as that drawn from the front chambers.

The basin of the tank which contains the molten glass bath is composed of refractory blocks and as the body of the bath moves forward toward the drawing end of the tank, the side walls thereof are at least slightly cooler than the inner portion of the bath. Impurities, such as incompletely reacted glass batch, products of erosion along the refractory walls, foam, etc., tend to collect and move toward and along the side walls of the tank. Since the tank walls are somewhat cooler than the body of the bath, there is retardation of reaction of the glass ingredients along this area. Solution from the tank basin walls may form in effect a protective shelf for the partially refined glass as it proceeds along the walls where it is shielded from full effect of the heat. Convection currents move from the center of the bath towards the walls, particularly in the upper strata of the bath where poorer quality is more pronounced. Convection currents also move vertically and angularly downward along the side walls as the cooler glass sinks and the warmer upper glass moves in to take its place. This glass contaminated with impurities, including refractory solution, will become involved in eddy currents and will mix with the better quality of glass somewhat close to the walls. It is recognized that the lower portion of the molten glass bath below its surface moves in a reverse direction; that is, back toward the hotter body portion nearer the charging or rear end of the tank.

According to this invention, the characteristics discussed above of the molten glass bath in the tank are taken advantage of in designing tank walls and in adding elements in such manner as to improve the general quality of the glass in the side drawing chambers, as well as in the end drawing chambers, and more completely to control the action of the bath in its tendencies toward movement.

In the drawings:

Fig. 1 is a fragmentary horizontal section showing diagrammatically a glass melting tank or furnace; Fig. 2 is a fragmentary plan, on a larger scale, of a skim kiln or compartment; Fig. 3 is a fragmentary vertical section taken substantially along the line III—III of Fig. 2; Fig. 4 is a fragmentary vertical section taken substantially along the line IV—IV of Fig. 2 and illustrating added adjusting mechanism; and Fig. 5 is a fragmentary plan of a skim kiln and alternate arrangements of elements associated therewith.

In one form of the invention there is provided a glass melting tank 20 adapted to contain a molten glass bath which moves generally from a rear batch-charging end 21 toward a drawing end of the tank where front drawing chambers 24 and side drawing chambers 25 are formed. During the tank operation, the glass ingredients are melted and maintained in molten state by means of flames from suitable fuel fed through side ports 27 along the sides of the tank. In this type of apparatus, known as a regenerative tank, the flames are played over the surface of the bath alternately at proper intervals from opposite sides of the tank. Ordinarily tanks of this type are operated continuously over considerable periods of time.

Before entering the forward portion of the tank, the glass bath passes underneath a refractory floater 28 extending across a narrow channel or neck portion 29 of the tank and resting upon the surface of the bath. This floater is designed to skim off and direct toward the tank sides surface impurities that may collect or form upon the bath. Skim kilns or compartments 30 on opposite sides of the tank are formed either forward or rearward of the location of the floater. A refractory floater 35 disposed across each kiln 30 at its mouth is positioned in guides 36 formed in the opposite walls of the kiln. The floater can be made to ride at the desired depth upon the molten bath by hollowing out to proper depth upper portions thereof, as indicated at 37.

A bridge 40 of refractory in slab form traverses the skim kiln 30 in substantially horizontal direction and its opposite ends are slidably mounted in guides 41 formed vertically in the opposite inner sides of the walls of each kiln. The bridge 40 is submerged at proper depth beneath the surface of the molten bath, the level of which is indicated at 42, and the upper bridge surface is beneath the bath level. The lower bridge surface is spaced from the bottom of the tank.

It is to be understood that the bath inside the kiln is maintained at somewhat lower temperature than the body of the glass bath and that the hotter molten glass drifts toward the cooler mass in the kiln. Therefore, along the sides of the tank, the hotter glass which moves toward the entrance of the kiln is drawn into the latter beneath the floater 35 and over the top of the bridge 40. As it becomes cooler, the surface glass in the kiln sinks to such depth as to be able to pass beneath the bridge back to the body of the bath. Since there is movement in the tank basin of the lower body of the bath back toward the charging end, the impurities along the marginal portions of the bath are thus returned to the hotter portions of the tank for further refinement.

In order to maintain the bridge 40 in proper position in the guides 41, or to adjust its position therein, an arm 43 having a downwardly projecting finger 45 at one end thereof, rests upon a piece of refractory 46 that is disposed upon each end portion of the bridge. Each arm has an intermediate pivot connection 47 securing it to a support 48, and the arm end opposite the finger 46 is provided with a bolt 49 screw-threaded therein and adapted to contact the upper surface of the support. Since the bridge tends to float in the molten bath surface and to cause the bolt 49 to be pressed downwardly on the support, the arm 43 can be adjusted to hold the bridge at the desired depth below the surface of the bath.

In the arrangement shown in Fig. 5, a bridge 40 and its mountings in the walls of the kiln 30 are the same as those described with reference to Fig. 2. However, another form of floater 50 is shown, which is disposed across the mouth of the kiln; that is, it floats upon the body of the bath along the inside line of the tank wall. This floater is hollowed out, as indicated at 51, and the end 53 thereof that faces rearwardly is inclined or beveled to define an acute angle with the adjacent tank wall, the apex of the angle pointing toward the kiln.

An adjusting device 54 pivoted, as indicated at 56, to the rear portion of the floater includes a rod 57 screwthreaded through a bracket 59 that is mounted upon the wall of the tank. This device extends over the upper edge of the tank basin wall. A jacket 60 surrounds the rod and is connected to a flexible conduit 61 which is adapted to supply cooling fluid to the rod. By operating the adjusting device, the floater 50 can be adjusted to and from the position indicated in the broken lines of Fig. 5. As shown in this figure, the floater can serve as a trap to catch and direct impurities into the kiln without the need of having all of them pass undeneath such floater in entering the kiln.

Although several arrangements of structure have been shown and described in detail, it will be apparent to those skilled in the art that the invention is not so limited, but that various changes can be made therein without departing from the spirit of the invention or from the scope of the appended claims.

I claim:

1. In a glass melting tank for containing a molten glass bath at predetermined level and including side walls running longitudinally forwardly and rearwardly of the tank, compartments on opposite sides of the tank having forward and rearward walls defining mouths opening laterally at said side walls into the body of the tank, oblong refractory bars disposed substantially longitudinally with respect to said side walls and extending between forward and rearward compartment walls on opposite sides of the tank to control flow of molten glass into and out of said compartment, and means for holding the refractory bars at predetermined locations with respect to the forward and rearward walls of the compartments.

2. In a glass melting tank for containing a molten glass bath at predetermined level and having longitudinal side walls extending from a charging end to a withdrawing end of the tank, a compartment on one side of the tank having a mouth opening through one side wall into the tank proper, guides in opposite walls of the compartment and being aligned in a direction longitudinally of the tank, and a floater extending substantially longitudinally of the tank between the opposite walls of said compartment and fitting at its opposite extremities in said guides.

3. In a glass melting tank for containing a molten glass bath at predetermined level and having side walls, a compartment at one side of the tank having a mouth opening through one side wall into the body of the tank, and a floater traversing the mouth of the compartment, said floater having an inclined end surface for collecting impurities and directing them toward the compartment.

4. In a glass melting tank for containing a molten glass bath at predetermined level and having longitudinal side walls, a compartment defined by the wall at one side of the tank and having a mouth opening laterally into the body of the tank, a floater of refractory material traversing the mouth of the compartment and resting upon the surface of the bath to control impurities from upper marginal portions of said bath into the compartment, and a bridge traversing an intermediate portion of the compartment between the bottom thereof and the level of the bath to assist in circulating the portion of the bath in the compartment back into the lower body of said bath.

5. In a glass melting tank for containing a molten glass bath at predetermined level and having longitudinal side walls, a compartment defined by the wall at one side of the tank and having a mouth opening into the tank, a floater of refractory material traversing the mouth of the compartment and resting upon the surface of the bath, an adjusting device connected to the floater for moving one end thereof farther out into the molten bath at least partially to open the mouth of the compartment along the bath surface, and means for supporting said adjusting device.

6. In a glass melting tank for containing a molten glass bath at predetermined level and having longitudinal side walls, a compartment defined by the wall at one side of the tank and having a mouth opening into the body of the tank, guides in opposite walls of the compartment and extending from the tops of said walls downwardly, a refractory bridge having opposite ends slidably mounted in said guides, means contacting opposite end portions of said bridge and adjustable vertically to vary the position of the bridge in the compartment, and means for vertically adjusting the first named means.

7. In a glass melting tank for containing a molten glass bath at predetermined level and having side walls, said side walls including outwardly offset compartments having mouths opening laterally into the body of the tank for communication of the molten bath to and from said compartments, a refractory slab traversing the area leading to the interior of each compartment and disposed on the surface of the molten glass bath, and means associated with the side walls and refractory slabs for maintaining the latter in their traversing position on the glass bath.

WILBUR F. GAUNDER.